(12) United States Patent  (10) Patent No.: US 8,185,838 B2
Bomers  (45) Date of Patent: May 22, 2012

(54) UNIVERSAL COMPUTER INPUT EVENT TRANSLATOR

(76) Inventor: Florian U. Bomers, San Francisco, CA (US)

( * ) Notice: Subject to any disclaimer, the term of this patent is extended or adjusted under 35 U.S.C. 154(b) by 2716 days.

(21) Appl. No.: 10/699,968

(22) Filed: Nov. 3, 2003

(65) Prior Publication Data

US 2005/0097570 A1  May 5, 2005

(51) Int. Cl.
*G06F 3/048* (2006.01)
(52) U.S. Cl. ........ 715/765; 715/764; 715/781; 345/156; 345/168
(58) Field of Classification Search ................. 345/168, 345/163, 762, 765; 715/318, 764, 765, 841; 719/318
See application file for complete search history.

(56) References Cited

U.S. PATENT DOCUMENTS

| | | | | |
|---|---|---|---|---|
| 5,392,386 | A * | 2/1995 | Chalas | 715/841 |
| 2002/0085037 | A1* | 7/2002 | Leavitt et al. | 345/765 |
| 2003/0071842 | A1* | 4/2003 | King et al. | 345/762 |
| 2004/0257341 | A1* | 12/2004 | Bear et al. | 345/157 |
| 2004/0263477 | A1* | 12/2004 | Davenport et al. | 345/163 |

OTHER PUBLICATIONS

Bome's Midi Translator; Copyright 1997-2003 by Florian Bomers; Modified Dec. 9, 2002; 3 pgs.
Author Unknown, online, archived documentation for software program known as "Girder" and identified as a Windows® Automation Tool. Available at: http://web.archive.org/web/20021210083957/www.girder.nl/index.php.

* cited by examiner

*Primary Examiner* — William Bashore
*Assistant Examiner* — Sherrod Keaton
(74) *Attorney, Agent, or Firm* — Murphy, Bilak & Homiller, PLLC

(57) ABSTRACT

A universal computer event translator, which can be implemented as a computer program for execution on a personal computer, handheld device, or other computer processing platform, provides configurable event translation to map essentially any type of computer input event into essentially any other type(s) of computer input event. The program detects occurrences of desired types of input events, which may be generated via a particular input device, a timer, or another program or processing running on the computer, and provides rules-based translation processing of those events. For example, the program can translate mouse events into keyboard events, MIDI or other port events into mouse or keyboard events, or into custom events. One incoming input event can spawn one or more translated input events of one or more types; conversely, different types of incoming input events can be mapped to a single type or multiple types of translated input events.

10 Claims, 4 Drawing Sheets

UNIVERSAL COMPUTER INPUT EVENT TRANSLATOR

BACKGROUND OF THE INVENTION

The present invention generally relates to input event processing in a general-purpose computer system, and particularly relates to input event translation that permits modification and re-mapping of input events from selected devices.

Computer systems typically offer one or more input devices for controlling their operations and inputting information. Common examples of these input devices include keyboards, mice, electronic tablets, etc. These devices offer reasonably good control in the context of everyday operations, but sometimes it is desirable to alter their control behavior to complement their use with a particular program, or to suit the special requirements of physically challenged persons or other users with special needs.

Moreover, certain types of control inputs favor the use of non-standard or otherwise custom input devices. For example, computer-based multi-track audio and video editing naturally favors the use of familiar editing controls, such as sliders, knobs, switches, etc. Sometimes software programs provide users with a visual facsimile of another device type. That is, the computer program is adapted to cause the computer to display a visual representation of the knobs, sliders, displays, and other controls normally associated with the type of instrument being simulated. While this offers a more intuitive (or at least familiar) representation, it still leaves operators using the familiar mouse and keyboard as the primary mechanisms for providing control input to the user.

Thus, a more intuitive control experience might be offered if the computer provided an input device that had at least some of the knobs, sliders, etc., being visually depicted onscreen. Of course, the drawback to using non-standard interfaces lies in the difficulty associated with providing input signals from them that are readily understood by the computer. Normally, the software vendor must write low-level device drivers needed to "interface" the non-standard control input with the computer. Most WINDOWS programmers are familiar with the often thankless and difficult task of writing reliable device drivers for non-standard input devices meant to control or interact with programs designed to run on computers using the WINDOWS operating system (OS). Similar efforts are required for other operating systems, such as the Macintosh OS.

Even where standard device inputs are being used, it may be desirable to alter input behaviors or re-map input events from one device to another. For example, the device control needs of a physically challenged person may be such that the mouse represents an easier mechanism for providing keyboard input or vice versa. In this context, then, the standard input from one device type must be mapped into another type of standard device input. In addition to re-mapping, or in the alternative, the input from a standard device may need to be modified, such as by filtering, attenuating, amplifying, or delaying, according to the particular needs of the given user.

Some programs have attempted to deal with subsets of these issues, such as BOME's MIDI TRANSLATOR, a program developed by the applicant of the instant application that re-maps standard MIDI input into keyboard events. In operation, the program thus enables a user to use a non-standard device, e.g., foot pedals, to generate keyboard input to the computer. However, BOME's MIDI TRANSLATOR and other existing programs leaves un-addressed the broader needs of input translation, wherein users require a universal mechanism that provides input translation, e.g., re-mapping, filtering, etc., for a wide range of standard and non-standard devices based on an easy-to-use, configurable program.

SUMMARY OF THE INVENTION

The present invention comprises a method and apparatus to translate selected types of incoming input events into translated input events. In an exemplary embodiment, the present invention comprises a computer program adapted for use on a general purpose computer, such as a personal computer (PC) running a WINDOWS OS, that enables a user to select one or more types of input events of interest, associate each of those event types with one or more software-based event translators, and configure the translation behavior of each translator such that incoming input events of the selected type(s) are intercepted and processed by the associated translator(s) according to the defined translation rules. Thus, the computer program allows, among other things, users to re-map selected types of input event into one or more other types of input events, spawn multiple input events based on the occurrence of one incoming input event, modify incoming input events in terms of their parameters, and time delay selected types of input events.

In an exemplary embodiment, the program provides a representation of available input device types to the user (e.g., mouse, keyboard, MIDI, or custom), and enables users to select a given input event type, and define one or more translators for that event type. Each translator may include default translation behaviors, but is configurable such that each translator performs a desired re-mapping and/or a desired modification for input events of the type associated with it.

Translation behaviors include but are not limited to general actions and rules-based translation processing actions. General actions include configuration choices such as whether input events should be "swallowed" by the translator. In this context, a given translator may be configured to swallow an incoming input event with regard to any remaining translators that would otherwise process the event, or it may be configured to swallow the event with regard to other processes running on the computer, e.g., prevent the event from reaching a currently active computer application that would otherwise receive the event and provide native processing for it.

In addition to these general rule configurations, rules-based translation processing actions can further include event re-mapping choices, and filtering choices, such as whether the translation action should be time-delayed, and whether the translation action scales or otherwise modifies the triggering input event. For example, the user could define a mouse event translator that intercepted all mouse movements at the operating system level and translated them into desired keystrokes, or inverted them, de-sensitized them, smoothed them, delayed them, etc.

In general, the present invention comprises a method and apparatus to provide computer users with a configurable software program that allows them to select one or more types of input device events, and configure corresponding event translators such that incoming input events of the selected types are intercepted and processed according to the translation rules of the configured event translators. As such, the present invention provides expert and non-expert users alike with the ability to interface a variety of standard and custom device types and provide customized input event processing for those devices.

DETAILED DESCRIPTION OF THE INVENTION

Figure 1:
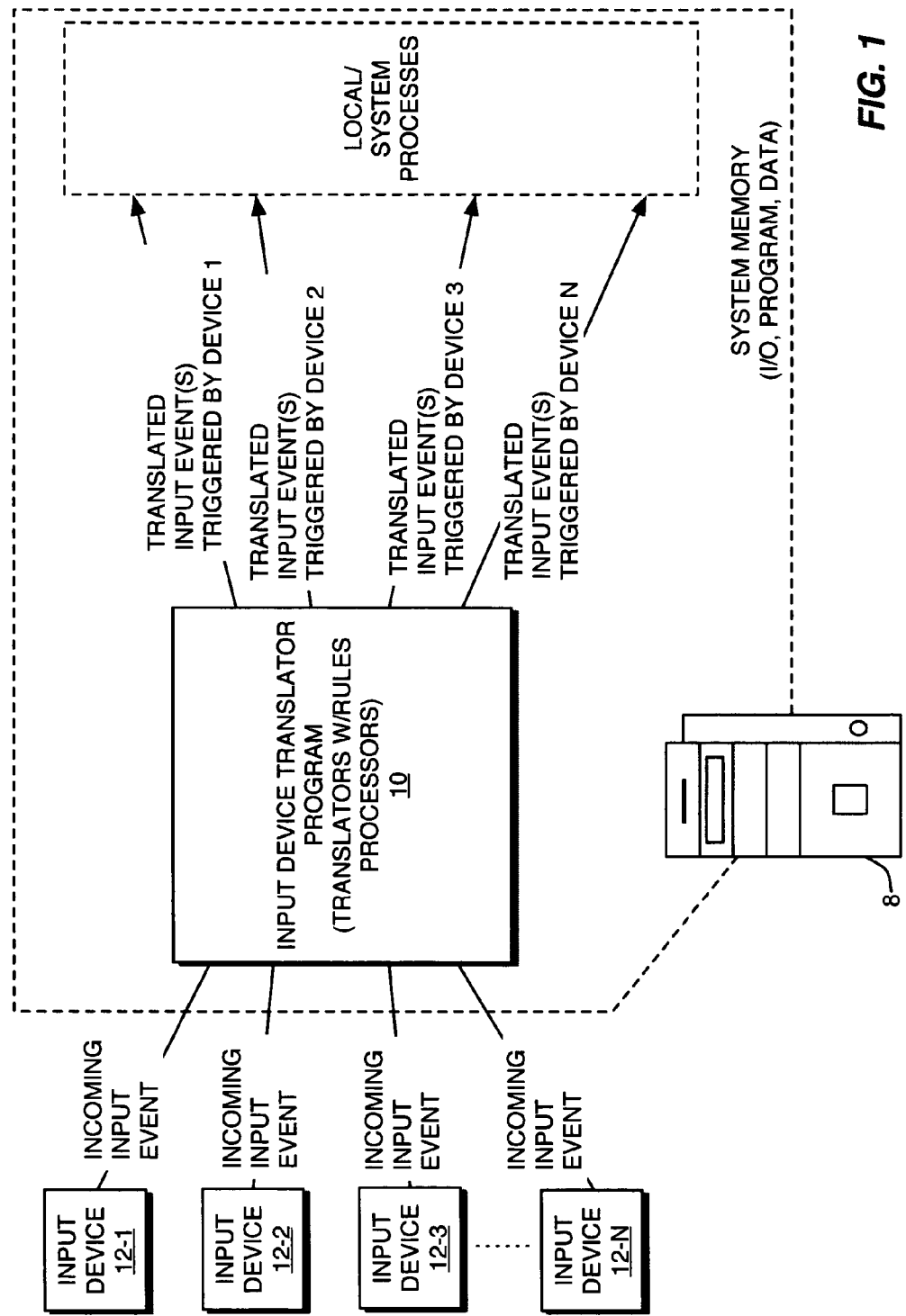
FIG. 1 is a diagram of an exemplary embodiment of an input device translator software program according to the present invention.

FIG. 1 illustrates a computer system 8, such as a WINDOWS based personal computer, that embodies an Input Device Translator (IDT) program 10 according to the present invention. The IDT program 10, which may comprise program instructions maintained in a computer readable medium within or accessible to computer 8, provides users of computer 8 with a convenient mechanism to change or otherwise modify the input events generated by selected ones of input devices 12-1 through 12-N, and to modify the input events associated with other programs and/or the operating system, e.g., timers, etc.

Broadly, the IDT program 10 provides a real-time system to translate one input method into another input method, or to modify the behavior of one or more selected input methods. IDT program 10 thus provides a flexible and easily configurable mechanism for re-mapping and filtering one or more selected input methods. As used herein, an input method is a type of incoming input event associated with a particular type of hardware device or with a particular type of software event or software program. The IDT program 10 provides a generic and easily configurable mechanism for capture and intercept an input method's actions (events) and generate/simulate another input method's actions or modify the method's action in response. Because it is generic and can be configured to intercept a broad variety of input methods, the IDT program 10 can be used to link any combination of input methods.

For example, an artist could configure the IDT program 10 to intercept standard MIDI input events received from a MIDI keyboard or other MIDI device via a standard MIDI interface and translate those MIDI events into video projector control signals. The IDT program 10 provides a readily configurable link between the MIDI port and the video projector. Other examples come to mind, such as using neural impulses (Electroencephalograph, EEG), breath pickup devices (blow tube transducer signals), eye tracking signals, IrDA input, etc. to provide input events to the computer 8, and then using the IDT program 10 to provide desired translations of those non-standard inputs into translated input events, such as MIDI, mouse, or keyboard, etc.

As is understood by those skilled in the art, computer 8 includes one or more Central Processing Units (CPUs) and storage for operating system files, program files, data, etc., system memory (RAM), and various device Input/Output (I/O) interfaces. Computer 8 can comprise a handheld or pocket computer, e.g., a Personal Digital Assistant (PDA), or the like. As such, computer 8 can be configured to run the PALM or other OS. In an exemplary embodiment, computer 8 comprises any of a WINDOWS based computer, a Macintosh OS X computer, a Linux computer, etc., and it should be understood that the IDT program 10 can be adapted to a variety of operating systems and computer configurations.

According to an exemplary embodiment of IDT program 10, a user selects one or more types of input events of interest, and then defines desired event translations for those types of incoming input events. By way of non-limiting example, a user may configure the IDT program 10 to intercept mouse input events and re-map (translate) those events into defined keystrokes such that keyboard input may be affected by mouse movement. As another non-limiting example, a user may configure the IDT program 10 to translate mouse input events not into another input event type, but rather to translate them based on a mathematical function. Thus, a user could configure the IDT program 10 to translate mouse input events by inverting the up/down and left/right sense of mouse movements, by smoothing the input movements, by time delaying them, etc. Broadly, the computer program 8 can generate/ simulate input events of any configured type responsive to receiving input events of any configured type.

In general, then, the IDT program 10 provides users with a mechanism to "filter" input events of a selected type according to a rules-based processing schema, wherein a user selects an input event type and then defines the desired rule or rules to be invoked whenever an input event of that type is detected. In an exemplary functional embodiment, the IDT program 10 comprises at least one event translator for each type of input event to be translated. Multiple event translators can be associated with the same event type such that an input event of a given event type spawns multiple translated events.

Figure 2:
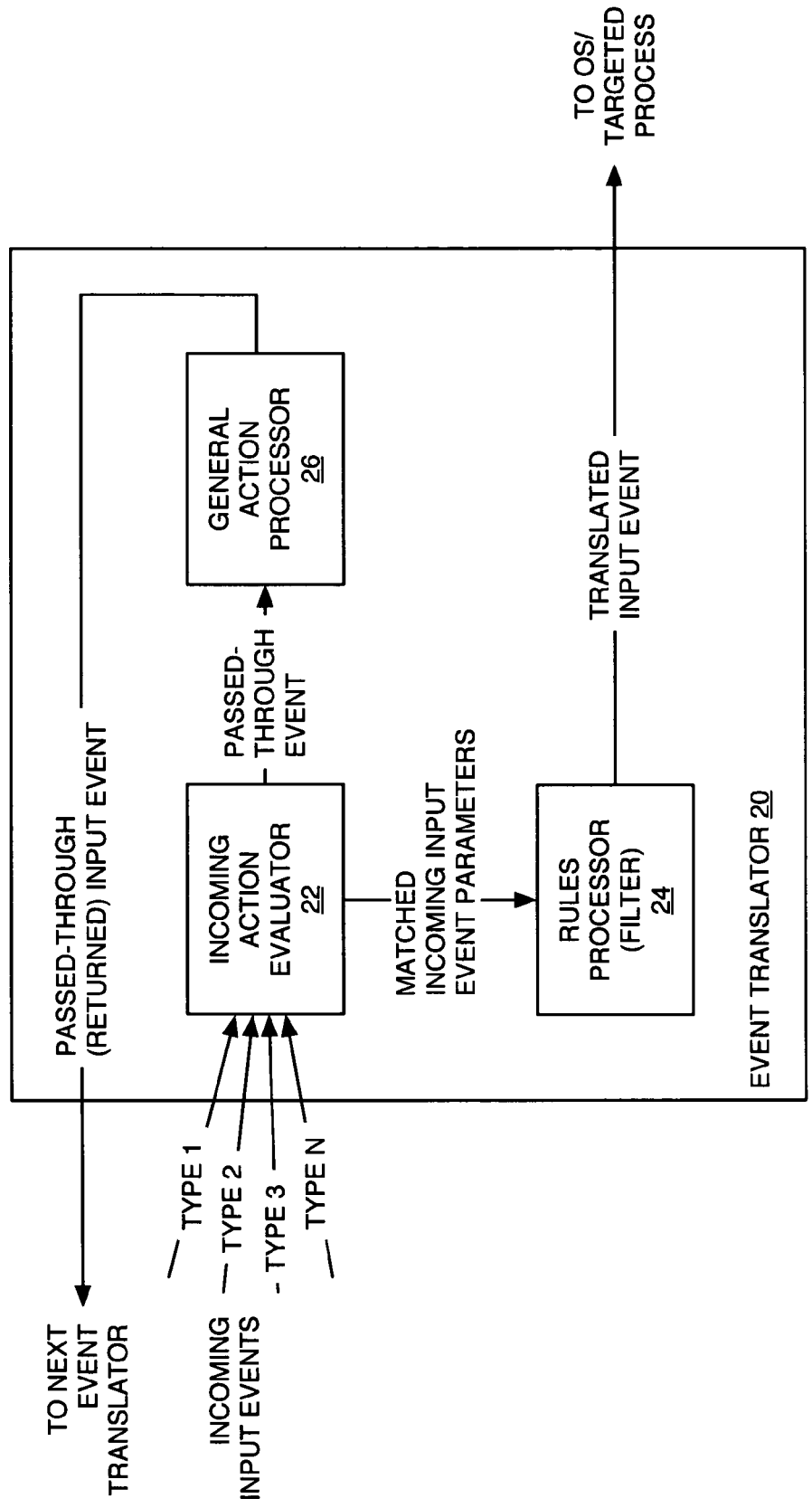
FIG. 2 is a diagram of an exemplary embodiment of an event translator.

In any case, FIG. 2 illustrates an exemplary functional structure for a software-based event translator 20 that comprises an incoming action evaluator 22, a rules processor (filter) 24, and a general action processor 26. Those skilled in the art will appreciate that, to some extent, the functional divisions and names of software modules is arbitrary and will understand that the same or similar functionality can be obtained by other functional arrangements.

In any case, evaluator 22 "looks" at incoming input events to determine whether any are of the type that it is configured to respond to. If an incoming input event is of the type it is configured to process, evaluator 22 deems that input event to be a match, "captures" the input event, and passes the event parameters (values, etc.) along to the rules processor 24 for processing. As explained, rules processing may comprise re-mapping the input from one input event type to another (mouse-to-keyboard, MIDI-to-keyboard, etc.) in a one-to-one mapping arrangement, mapping the input event to multiple event types in a one-to-many mapping arrangement, or may comprise applying a filtering function to the input event (e.g., attenuate, smooth, amplify, time delay, etc.).

Regardless, rules processor 24 applies the configured processing rules to the captured input event to generate a translated input event, which is then provided as a input event corresponding to a targeted device or process, e.g., an external port (serial, USB, or MIDI, etc.) or a system message/event queue, or is provided to a targeted program or other process running on computer 8. Further, a general action processor 26 provides general event processing according to user-configurable behaviors.

For example, the general action processor 26 can be configured to "swallow" or not to swallow the incoming input event. If it is configured to swallow the event, then event translator does not "pass through" the triggering input event and other programs/processes being executed by computer 8 do not see the swallowed event. In contrast, if the general action processor 26 is configured not to swallow the triggering input event, then it passes through the event, i.e., it returns the triggering event to the IDT program 10 for processing by other event translators 20, and/or for release back to the system queue for processing by the OS and other programs.

Figure 3:
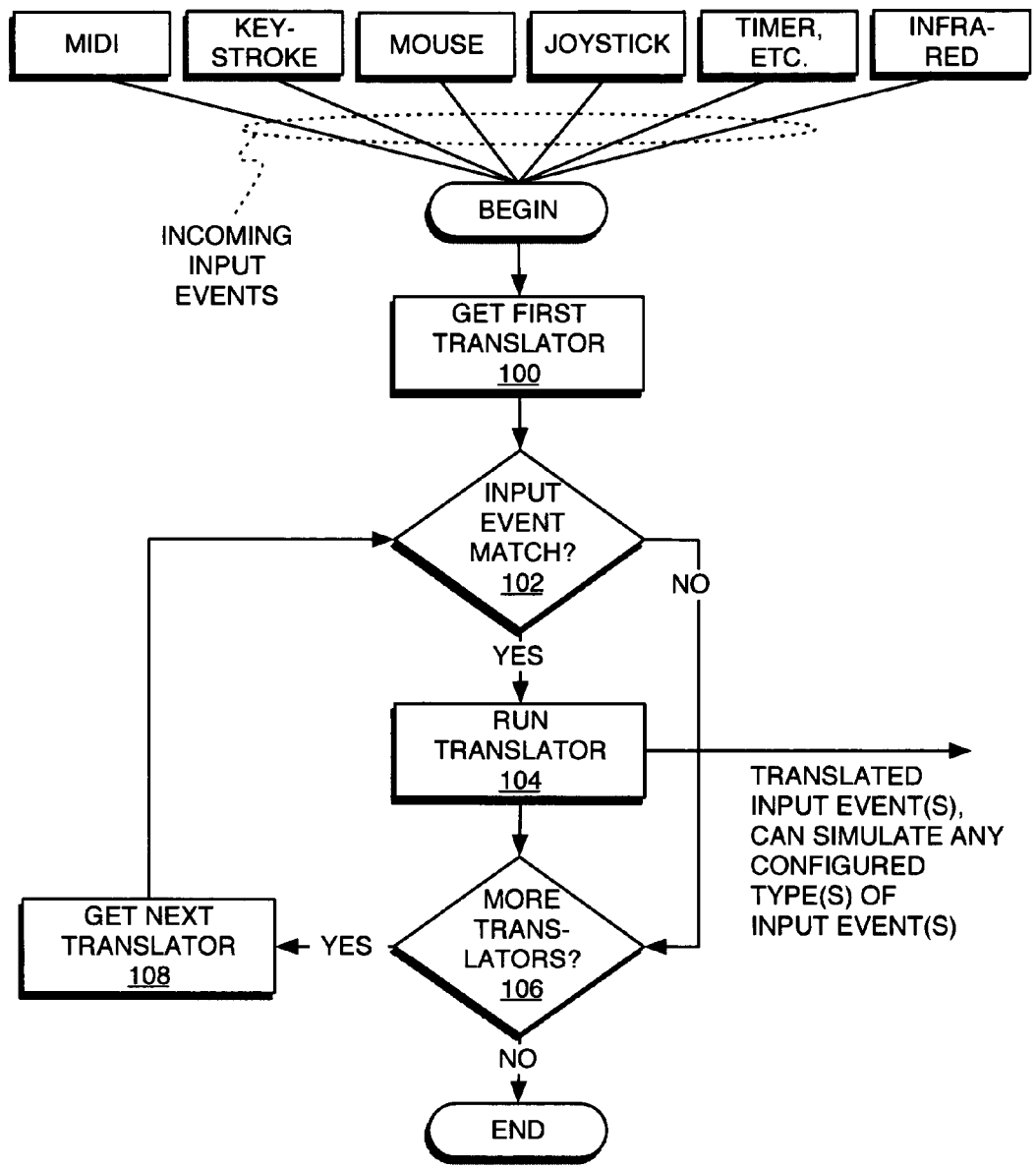
FIG. 3 is a diagram of exemplary processing logic for an input device translator program.

In implementation, then, the IDT program 10 functionally may comprise any number of user-configured event translators 20, and the IDT program 10 can be configured to capture or otherwise inspect incoming input events and process such events on a selective basis according to whether their event types match any of the configured types of the event translators 20. FIG. 3 illustrates exemplary program logic for such an implementation.

Processing begins with the IDT program 10 monitoring or otherwise intercepting incoming input events, which may comprise a plurality of event types. Such types include, but are not limited to, MIDI, keyboard, mouse, joystick, timers, infrared, and other type of input events. An incoming input event can originate from a corresponding input device, from the operating system, or from another program. In any case, the IDT program 10 determines whether a given input event is of a type that matches a first one of device translators 20 (Step 100).

If the event is of a type the translator 20 is configured to respond to, the IDT program 10 runs that translator 20 (Step 104), which entails processing the input event according to the rules defined for the event translator (Step 104). Rule processing generates a corresponding translated input event that is output by the event translator 20. Note that event translation rules also can be configured to cause translator 20 to "exit", i.e. not to generate/spawn an output event. Such a configuration does not interfere with the translator's event "swallowing" capability and is thus useful for selectively ignoring specific input events, depending on the particular event parameters. For example, the user might want to restrict mouse movements to a particular area on the screen. A corresponding translator rule would check the x/y coordinates, and only if the coordinates are in the specific area, generate the output event (in this case the same input event, e.g., an event pass-through).

With regard to swallowing, a translator's swallowing function comprises an "overloaded" function that performs either or both of two swallowing functions. The first swallowing function, a "stop processing" function for each defined translator 20 is enabled or disabled as part of the configuration of the IDT program 10. The stop-processing swallowing function prevents other (subsequent) translators 20 from "seeing" the incoming input event. A second form of swallowing is to some extent operating system dependent. That is, if the operating system permits such operations, a translator 20 can be configured to prevent an incoming input event from being passed through the IDT program 10. With this form of swallowing, other programs or processes running on computer 8 are prevented from receiving the incoming input event. Thus, IDT program 10 can selectively prevent an incoming input event from being passed through to the original or intended recipient of that event, e.g., prevent keyboard input from reaching the currently active program. Of course, the translated input event can be returned to the OS message queue for processing by one or more other active processes, etc.

In any case, if there are more translators 20 and the first one of them was not configured to swallow the incoming input event (Step 106), the IDT program 10 gets the next translator 20 (Step 108) to see whether the incoming input event matches one or more remaining event translators 20. If so, processing repeats as above (Steps 104-108). In this manner, one incoming input event can spawn any number of translated input events based on configuring more than one event translator 20 to respond to that type of incoming input event. Alternatively, a single input event can spawn multiple translated input events based on configuring the rules processor 24 of the event translator 20 that is configured to capture incoming events of that type to generate two or more translated input events responsive to processing a capture incoming input event.

Figure 4:
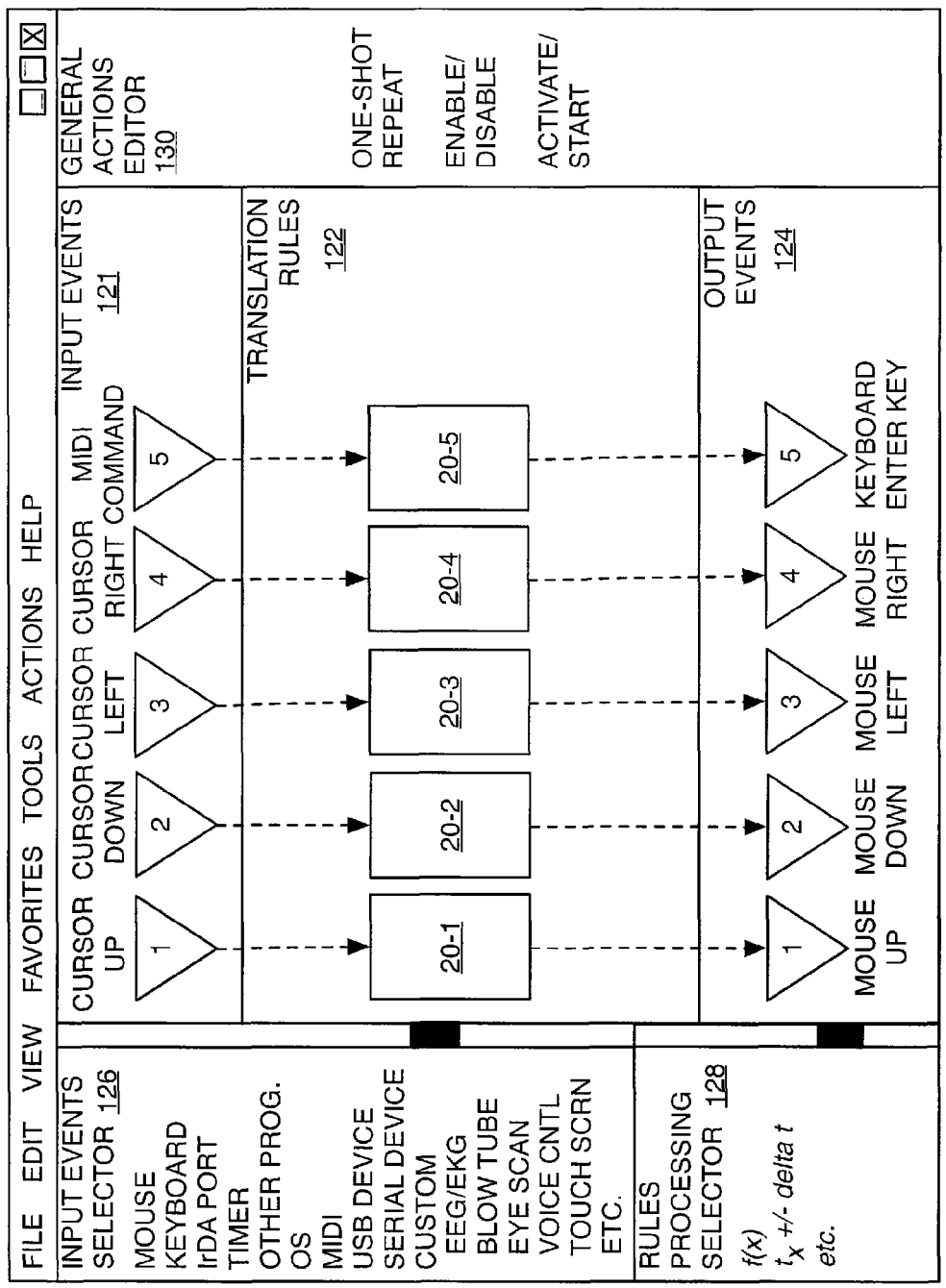
FIG. 4 is a diagram of an exemplary graphical user interface presented by an input device translator program according to one embodiment of the present invention.

FIG. 4 illustrates an exemplary graphical interface 120 provided by IDT program 10 that can be manipulated by a user to create or otherwise define one or more event translators 20. The interface 120 may be organized into an input events field 121, a translation rules field 122, an output events field 124, an input events selector field 126, a rules processing selector field 128, and a general actions editor field 130. The illustrated arrangement enables a user to drag-n-drop predefined input event types from the events selector field 126 to the input events field 121. Dropping an event type into field 121 signifies that the user wishes to capture incoming input events of that type. Similarly, dropping an event type into field 124 signifies that the user wishes to generate translated input events of that type.

The user then can graphically connect incoming input events appearing in field 121 to translated incoming events appearing in field 124 via interconnecting them through one or more graphically represented event translators 20. That is, interconnecting a graphically depicted input event appearing in field 121 with a graphically depicted input event appearing in field 124 through a graphically depicted event translator 20 appearing in field 122 defines an event translation flow. At that point, the user can drop predefined or custom rules appearing in field 128 into depicted event translators 20 to configure the desired event translation behavior for each event translator 20.

Further, the user can define the general action behavior for each depicted event translator 20 by highlighting a particular event translator 20 and then editing general action configuration settings in field 130. These general actions can include, as mentioned before, a flag setting that determines whether the intercepted incoming input event is swallowed or not swallowed, which can dictate whether other event translators 20 (and other processes outside of the IDT program 10) are given an opportunity to see the raw incoming input event. However, the general actions can include many other settings, such as timer/repeat settings that can be configured by the user to control whether a given incoming input event triggers a single (one-shot) translated input event or a series of timed (repeated) translated input events.

In actual implementation, the IDT program 10 can use incoming input event timers and/or translated input event timers. Translated input event timers can be included in event translators 20, and can be configured to generate one or more desired translated input events at a given delay relative to the triggering incoming input event. Such timers can be predefined to generate specific event types and thus a user could simply select the desired timer types and configure them for the desired delay.

Other general actions can include outgoing enable/disable settings that can be used to enable/disable program execution responsive to capturing an incoming input event. Similarly, the general action configurations can include activate/start settings that can be used to switch the focus to a targeted program or process, or to launch or otherwise start that program or process responsive to the input event. Thus, a given event translator 20 can be configured to target its translated input events for receipt by a particular program or process such that the targeted program or process receives the translated input event even if that program or process did not have the "locus" at the instant the triggering incoming input event was received.

It should be understood by those skilled in the art that the graphical user interface 120 depicted in FIG. 4 is just an example of how IDT program 10 can be laid out from the user's perspective. As such, it is not limiting with respect to the implementation details of IDT program 10, and it should be understood that a wide variety of graphical interface designs and styles may be used without departing from the scope of the present invention, i.e., the same or similar information and capabilities can be embodied in many different screen layouts. Indeed, IDT program 10 may be varied in design and/or appearance depending on the particular requirements and limitations of the computer 8, e.g., IDT program 10 may be configured differently in terms of appearance and operation for use on a PALM-based PDA versus a WINDOWS-based desktop or laptop computer.

Regardless, as an example of applying the IDT program 10 to a particular user's requirements, assume that a user does not have a mouse connected to computer 8 but wants to move the mouse cursor via the keyboard's cursor keys. Furthermore, the user wants to simulate an "ENTER" keystroke using a foot pedal connected to computer 8 through a MIDI interface. Graphical interface 120 enables creation and modification of a list of event translators 120 to accomplish the desired event translations.

For this use case, five simple event translators 20-1 through 20-5 are created using the user interface 120. The first four translators 20-1 through 20-4 are used to control the four mouse directions using keyboard cursor keys, while the fifth translator 20-5 is configured to respond to MIDI foot pedal events.

An exemplary configuration for each translator 20 may comprise these items:
NAME—the translator's name;
INCOMING ACTION—the event type(s) the translator will respond to;
OUTGOING ACTION—the event type the translator generates in response to receiving the INCOMING ACTION;
FILTER LIST—one or more modifications, etc. to apply to the INCOMING or OUTGOING ACTION;
SWALLOW (IDT)—a "STOP PROCESSING FLAG" that determines whether processing with respect to any remaining translators 20 within the context of the IDT program 10 continues after translation; and
SWALLOW (System)—a "PASS THROUGH FLAG" that determines whether the event is passed through;

The first translator 20-1 is set up to respond to the CURSOR UP key. Therefore, its INCOMING ACTION is set to "Key Press: CURSOR UP." Key press incoming actions may have an extra flag (PASS THROUGH FLAG) that is set or cleared to control whether the translator 20 swallows or passes through the key press event. Here, since the user wants to control only the mouse with the cursor keys, the pass-through flag of event translator 20-1 is cleared to indicate that the key press event should be swallowed rather than passed on to other applications.

If the user wanted to modify the key press event, he could edit the filter list in the rules processor 24 of translator 20-1, but no such modifications are desired here. Thus, the FILTER LIST of event translator 20-1 remains empty. However, the user does configure the OUTGOING ACTION setting in the rules processor 24 to indicate that the CURSOR UP key press event should be translated into a defined mouse movement event. For example, the user can configure the OUTGOING ACTION such that event translator 20-1 generates a MOUSE UP "x" PIXELS command in response to each detected CURSOR UP key press event, where "x" is a desired number of pixels. Translators 20-2 through 20-4 are configured similarly to translator 20-1 but for cursor keys DOWN, LEFT, and RIGHT, respectively.

Translator 20-5 is configured differently, however. Translator 20-5 has its INCOMING ACTION set to a MIDI command, and its OUTGOING action is set to convert that MIDI command into an "ENTER" key press event. In this example, the foot pedal sends a standardized MIDI controller (code 0xB0) with number 0x40 (Sustain Pedal): with a value >0 when pressed, and with a value of 0 when not pressed. Thus, the MIDI IN command, is formulated as follows (in hexadecimal notation): "B0 40 pp," where "pp" is a variable: Translator 20-5 thus will be triggered upon reception of a MIDI message that has 3 bytes, and starts with B0 40. The third byte can have an arbitrary value as sent by the MIDI device (i.e. the foot pedal); the variable "pp" will be set to this value. In order to execute the OUTGOING ACTION only when the foot pedal is pressed (i.e. pp>0), but not when it is released (i.e. pp=0). A rules processing filter can be configured to detect the difference between press and release events for the foot pedal.

In other words, the rule will have to exit processing of the translator 20 if pp=0, since the ENTER keyboard translated input event should be generated only if the pedal is depressed; not when it is released. Thus, the rule may be configured as: "if (pp==0) then stop processing this translator." Of course, as described earlier, the translator 20 also can be configured to swallow the event with respect to any remaining translators 20, or can be configured to pass the event along for selective processing by one or more other translators 20 that match the event type.

Once the translators 20 are configured, graphical user interface 120 can update its display to depict an overview of all currently installed translators 20. According to the current example, such a display would include information similar to that in the following list:
1 "Cursor Up" CURSOR UP→Mouse Position y=y−5
2 "Cursor Down" CURSOR DOWN→Mouse Position y=y+5
3 "Cursor Left" CURSOR LEFT→Mouse Position x=x−5
4 "Cursor Right" CURSOR RIGHT→Mouse Position x=x+5
5 "Foot pedal" MIDI IN B0 40 pp→filters→Key press ENTER.

With the above framework, three detailed examples explain exemplary internal operations associated with (1) the left cursor key being pressed; (2) the foot pedal being pressed; and (3) the foot pedal being released. As detailed later herein, when a translator 20 is configured to have a key press as its INCOMING ACTION, a system-wide "Hook" can be installed in the WINDOWS OS. The hook routes all key information through a callback function in the IDT program 10. That callback function may cancel the key event, or modify it. Similarly, if any defined translator 20 contains a MIDI IN event as its INCOMING ACTION, the MIDI interface is opened in a listen mode so that the IDT program 10 receives all MIDI messages that are sent to that MIDI interface. Such operations may be based on using a standard WINDOWS API to access MIDI ports. Similarly, for the current example involving keyboard and mouse translated events, standard WINDOWS APIs may be used.

In a first incoming input event, the left cursor key is pressed. WINDOWS calls back into the hook callback function of the IDT program 10 with that key press as the incoming input event. The callback function of the IDT program 10 goes through the list of defined translators 20 (refer back to FIG. 3), and each defined translator 20 in turn checks whether the current incoming input event matches its configured INCOMING ACTION. Such progression through the configured translators 20 can be performed step-wise sequentially wherein the IDT program 10 checks whether the event types matches the first configured translator 20, then checks the next translator 20, and so on. Of course, event swallowing can stop such sequencing. Note that the user can configure the order of translators 20 and move them up or down in list order to achieve the desired sequential arrangement of translators 20.

In the configured example, the event type does not match translators 20-1 and 20-2, so neither one of them processes the incoming input event. However, translator 20-3 does have an INCOMING ACTION that matches the left cursor key input event, so it processes the event and generates the configured OUTGOING ACTION (MOUSE LEFT×pixels), which translates the key press into a mouse movement. As the key press callback function of WINDOWS is in the process context of the currently active program (i.e. not necessarily the IDT program's process context), the mouse simulation cannot take place immediately. Rather, it is placed into an internal OUTGOING ACTION queue. When the OUTGOING ACTION routine returns, the PASS THROUGH flag is examined: since it is cleared (no pass through), the IDT program 10 sets a flag that notifies WINDOWS that this key press message has been fully handled.

After successfully processing the key press event, translator 20-3 examines its STOP PROCESSING flag to determine whether any additional translators 20 should be executed. If the flag is set, no further translators 20 are executed, meaning that even if any of them were configured with an INCOMING ACTION that matched the left cursor key press, they would not be executed, and the callback function of the IDT program 10 would return control back from the key press hook function to WINDOWS.

Meanwhile, the OUTGOING ACTION queue of the IDT program 10 "wakes up" from its wait state—it is in its own thread that becomes active whenever an event is placed into the queue. Since it is a processing thread in its own right, the queue processing is interleaved or simultaneous with other threads and processes. The queue processing goes through all the OUTGOING ACTIONS in the queue and executes each of them in turn. Here, there is only the outgoing mouse event to be processed; thus the queue processor of IDT program 10 calls a standard WINDOWS-defined function "mouse_event." The queue processing function passes the relative movement in pixels (i.e. −5 for x, 0 for y) and a flag to signal relative movement rather than absolute positioning (MOUSEEVENTF_MOVE). Then, the OUTGOING ACTION is removed from the queue, and the queue thread goes into wait state again. An alternate, possibly more efficient implementation could intercept the key press on a driver level and thus even prevent the WINDOWS kernel from processing the key press.

With regard to the foot pedal incoming events, pressing the foot pedal will send a MIDI event to the MIDI IN port of the computer 8 that has the value "B0 40 7F" in hexadecimal notation. The computer's MIDI driver calls the application-defined callback function in the IDT program 10. In the same manner as the callback function of the keyboard hook, the MIDI callback function of the IDT program 10 now examines the list of configured translators 20 having MIDI IN INCOMING ACTIONS. The first translator 20 that matches the MIDI event type is translator 20-5. Translator 20-5 detects the matching event type and processes the MIDI event based on its configured processing rules. Assuming the "pp" is set to a non-zero value, i.e. 7F hexadecimal (127 decimal), the filter processing's conditional "if" exit is not satisfied and the event is thus processed to generate the desired OUTGOING ACTION. Since the translated input event should not be provided in the MIDI callback context of the IDT program 10, the OUTGOING ACTION is placed in the Outgoing Action queue as described above. Thus, when the Outgoing Action queue becomes active in its own thread, it will find the key press emulation event and generate the appropriate call to the WINDOWS API function "keybd_event" with the parameter(s) needed to emulate pressing the ENTER key. As above, a potentially more efficient embodiment of the IDT program 10 might use a device driver to detect the incoming MIDI event and/or to generate the translated keyboard event.

Therefore, although the particular manner in which the IDT program 10 is adapted to intercept incoming input events necessarily varies depending on the particular operating system it is configured to work with, exemplary WINDOWS-based embodiments may be based on the use of "hooking" and/or "subclassing," or be based on the use of low-level device drivers. With subclassing, a main program message loop can be instructed to pass a WINDOWS message (i.e., input event message) to a message loop defined by the IDT program 10 so that it can be inspected, and modified or translated as desired before retuning it to the main message loop.

With hooking, the IDT program 10 can be configured to install one or more so-called event hooks, such as the "WH_KEYBOARD" hook, the "WH_MOUSE" hook, the "WH_MSGFILTER", and the "WH_SYSMSGFILTER" hooks, to monitor the WINDOWS system message queue, which carries all system level event messages for mouse, keyboard, and other input events, for incoming input events. Such hooking can be done on a global level or can be program/process thread specific.

With global hooking, the IDT program 10 can be configured to monitor incoming input events targeted to or generated by any process running within the same "desktop" as it is being executed within. Such hook procedures can be installed in a Dynamic Link Library (DLL) for access by all programs operating within the same desktop space. Those skilled in the art will appreciate that other mechanisms exist for monitoring and intercepting all or some of the input event messages processed by the WINDOWS operating system. Thus, it should be appreciated that hooking and subclassing represent exemplary but non-limiting methods. Conceptually similar methods can be employed in other operating systems, such as in MACINTOSH and LINUX systems.

Similarly, other aspects of the present invention can be varied as needed or desired. Indeed, the present invention is not limited by the foregoing exemplary details. In general, the present invention provides a method and apparatus to translate input events occurring in a computer system into remapped or otherwise modified input events such that one type of input device can simulate another type of input device, or so that the behavior of a given input device or program can be altered quickly and easily according to the particular needs of a user. As such, the present invention is not limited by the foregoing discussion, but rather is limited only by the following claims and their reasonable equivalents.

What is claimed is:

1. A computer readable medium storing a computer program, the computer program configured for execution on a personal computer (PC) and comprising:
program instructions to enable a user to select a type of input event to said PC from a plurality of input event types;
program instructions to determine whether a given input event to said PC occurring during execution of the computer program by said PC matches the selected type of input event; and
program instructions to perform a desired input event translation by processing the given input according to one or more input event translation rules if the given input event matches the selected type of input event, said desired input event translation including a translation function that modifies incoming input events according to one or more user-configured functions;

wherein the program instructions to perform a desired input event translation by processing the given input according to one or more input event translation rules if the given input event matches the selected type of input event comprise program instructions to perform one or more of a plurality of translations comprising a re-mapping of the given input event type to one or more other input event types, a time-delay of the given input event, a parameter modification of the given input event, a swallowing of the given input event to hide it from one or more other computer processes, and a swallowing of the given input event to hide it from additional event translation processing.

2. The computer readable medium storing a computer program of claim 1, wherein the computer program comprises a WINDOWS-based program configured for execution on a WINDOWS-based PC.

3. The computer readable medium storing a computer program of claim 1, wherein the program instructions to enable a user to select a type of input event to said PC from a plurality of input event types comprise program instructions to enable selection from a plurality of event types include two or more of mouse events, keyboard events, MIDI events, Universal Serial Bus device events, RS-232 serial bus events, game port events, audio input events, analog input events, and infrared port events.

4. The computer readable medium storing a computer program of claim 1, wherein said re-mapping comprises re-mapping input events of the selected type into input events of at least one other type.

5. The computer readable medium storing a computer program of claim 1, wherein said translation function that modifies incoming input events according to one or more user-configured functions comprises program instructions to modify one or more event parameters of input events of the selected type.

6. The computer readable medium storing a computer program of claim 1, wherein including program instructions to define a translation function that modifies incoming input events according to one or more user-configured functions comprises including program instructions to modify one or more event parameters of the incoming input events.

7. The computer readable medium storing a computer program of claim 6, wherein the program instructions to modify one or more event parameters of the incoming input events comprise program instructions to apply a user-configured mathematical function at least to selected types of incoming input events.

8. The computer readable medium storing a computer program of claim 6, wherein the program instructions to modify one or more event parameters of the incoming input events comprise program instructions to apply a user-configured mathematical scaling to one or more event parameters of a user-selected type of incoming input event, to thereby create corresponding translated input events of the same user-selected type, but with one or more scaled event parameters.

9. A computer readable medium storing a computer program, the computer program configured for execution on a personal computer (PC) and comprising:

program instructions to enable a user to select a type of input event to said PC from a plurality of input event types;

program instructions to determine whether a given input event to said PC occurring during execution of the computer program by said PC matches the selected type of input event; and program instructions to perform a desired input event translation by processing the given input according to one or more input event translation rules if the given input event matches the selected type of input event, said desired input event translation including a translation function that modifies incoming input events according to one or more user-configured functions;

wherein the program instructions to perform a desired input event translation by processing the given input according to one or more input event translation rules if the given input event matches the selected type of input event comprise program instructions to time-delay input events of the selected type according to a desired time delay value.

10. A computer readable medium storing a computer program, the computer program configured for execution on a personal computer (PC) and comprising:

program instructions to enable a user to select a type of input event to said PC from a plurality of input event types;

program instructions to determine whether a given input event to said PC occurring during execution of the computer program by said PC matches the selected type of input event; and program instructions to perform a desired input event translation by processing the given input according to one or more input event translation rules if the given input event matches the selected type of input event, said desired input event translation including a translation function that modifies incoming input events according to one or more user-configured functions;

wherein the program instructions program instructions to perform a desired input event translation by processing the given input according to one or more input event translation rules if the given input event matches the selected type of input event comprise program instructions to swallow the given input event to hide it from one or more other computer processes, or to swallow the given input event to hide it from additional event translation processing.

* * * * *